United States Patent [19]

Kanno

[11] Patent Number: 5,481,756
[45] Date of Patent: Jan. 2, 1996

[54] DMA CONTROLLER MAILING AUTO-INITIALIZE HALTING UNIT

[75] Inventor: Naotaka Kanno, Kanagawa, Japan

[73] Assignee: NEC Corporation, Tokyo, Japan

[21] Appl. No.: 961,185

[22] Filed: Oct. 15, 1992

[30] Foreign Application Priority Data

Oct. 15, 1991 [JP] Japan .................................. 3-266551

[51] Int. Cl.[6] ............................ G06F 13/28; G06F 13/12
[52] U.S. Cl. ................. 395/842; 364/242.3; 364/242.31; 364/251.3; 364/DIG. 1
[58] Field of Search .................................... 395/425, 275, 395/842

[56] References Cited

U.S. PATENT DOCUMENTS 5,077,664  12/1991  Taniai et al. ............................ 395/425
5,325,489  6/1994   Mitsuhira et al. ...................... 395/275

*Primary Examiner*—Tod R. Swann
*Assistant Examiner*—Reginald Bragdon
*Attorney, Agent, or Firm*—Whitham, Curtis, Whitham & McGinn

[57] ABSTRACT

A DMA controller includes a transfer size register written with the number of DMA transfer operations to be performed, a transfer destination address register written with a transfer destination head address for the same DMA transfer operations to be executed, and a transfer size counter and a transfer destination address counter respectively loaded with contents of the transfer size register and the transfer destination address register when the DMA transfer is restarted, for the purpose of performing an auto-initialize operation. The DMA controller is configured so that when either or both of the head address and the transfer size for a next DMA transfer is not set in the transfer size register and the transfer destination address register in the course of execution of the DMA transfer before the next DMA transfer, the auto-initialize operation is halted.

4 Claims, 3 Drawing Sheets

DMA CONTROLLER MAILING AUTO-INITIALIZE HALTING UNIT

BACKGROUND OF THE INVENTION

1. Field of the Invention

The present invention relates to a DMA (direct memory access) controller, and more specifically to a DMA controller capable of continuously carrying out a DMA transfer while automatically setting either or both of a transfer size and a transfer destination address.

2. Description of Related Art

In a typical one of conventional DMA controllers, a transfer size register and a transfer address register are written with set values from a CPU (central processing unit), respectively. When a DMA transfer is started, the set value of the transfer size register is loaded to a transfer size counter, and the set value of the transfer destination address register is loaded to a transfer destination address counter, so that the DMA transfer is carried out using the values of the transfer size counter and the transfer destination address counter.

During a period of time after a first DMA transfer was completed and before a next DMA transfer is started, if the DMA controller were controlled by the CPU so as to set the transfer size register with a transfer size of the next DMA transfer and also to set the transfer destination address register with a transfer destination head address of the next DMA transfer, overhead inevitably occurs. In order to minimize this overhead, an auto-initialize operation has been proposed, in which, during a period of time in which the first DMA transfer is being executed, the CPU controls writes the transfer size and the transfer destination head address of the next DMA transfer into the transfer size register and the transfer destination address register, respectively, and when the first DMA transfer is completed, the set values of the transfer size register and the transfer destination address register are automatically loaded to the transfer size counter and the transfer destination address counter, respectively, so that the next DMA transfer is continuously carried out.

In the above mentioned auto-initialized operation of the conventional DMA controller, it is necessary that, during a period from the start to the completion of one DMA transfer, the CPU sets the transfer size register and the transfer destination address register for a next DMA transfer. However, if new values for a new DMA transfer have not been set to these registers until the DMA transfer being executed is completed, because of various factors such as CPU interrupt processings and a priority order between the DMA controller and the CPU, the values of the transfer size register and the transfer destination address register are loaded to the transfer size counter and the transfer destination address counter, respectively, regardless of whether or not the new values for a new DMA transfer have been set to the transfer size register and the transfer destination address register. In this case, the values of the transfer size counter and the transfer destination address counter are wrong, and therefore, the transfer data number and the transfer destination address cannot be ensured in the next DMA transfer.

SUMMARY OF THE INVENTION

Accordingly, it is an object of the present invention to provide a DMA controller which has overcome the above mentioned defect of the conventional one.

Another object of the present invention is to provide a DMA controller having means for ensuring the transfer data number and the transfer destination address in the next DMA transfer under the auto-initialize operation.

The above and other objects of the present invention are achieved in accordance with the present invention by a DMA controller comprising:

a transfer size register written, before a first series of DMA transfer operations being executed are completed, with the number of DMA transfer operations to be performed in a second series of DMA transfer operations to be executed next to the first series of DMA transfer operations being executed;

a transfer destination address register written, before the first series of DMA transfer operations being executed are completed, with a transfer destination head address for the second series of DMA transfer operations to be executed next to the first series of DMA transfer operations being executed;

a control unit configured to restart the DMA transfer for the second series of DMA transfer operations by using current set values of the transfer size register and the transfer destination address register and to generate a transfer completion status signal, when the DMA transfer for the first series of DMA transfer operations has been completed, the control unit being also configured to generate an auto-initialize halt operation setting signal indicating that an auto-initialize operation halting mode is set, and a register write confirmation status signal indicating that a new set value is written into either or both of the transfer size register and the transfer destination address register in the course of execution of the DMA transfer for the first series of DMA transfer operations;

an auto-initialize operation completion discriminator, receiving the transfer completion status signal, the auto-initialize halt operation setting signal and the register write confirmation status signal, for generating a halt request signal when all of the transfer completion status signal, the auto-initialize halt operation setting signal and the register write confirmation status signal are active; and an auto-initialize operation halting unit responding to the halt request signal so as to halt the auto-initialize operation and to generate a signal indicating that the auto-initialize operation has been halted.

The above and other objects, features and advantages of the present invention will be apparent from the following description of preferred embodiments of the invention with reference to the accompanying drawings.

DESCRIPTION OF THE PREFERRED EMBODIMENTS

Figure 1:
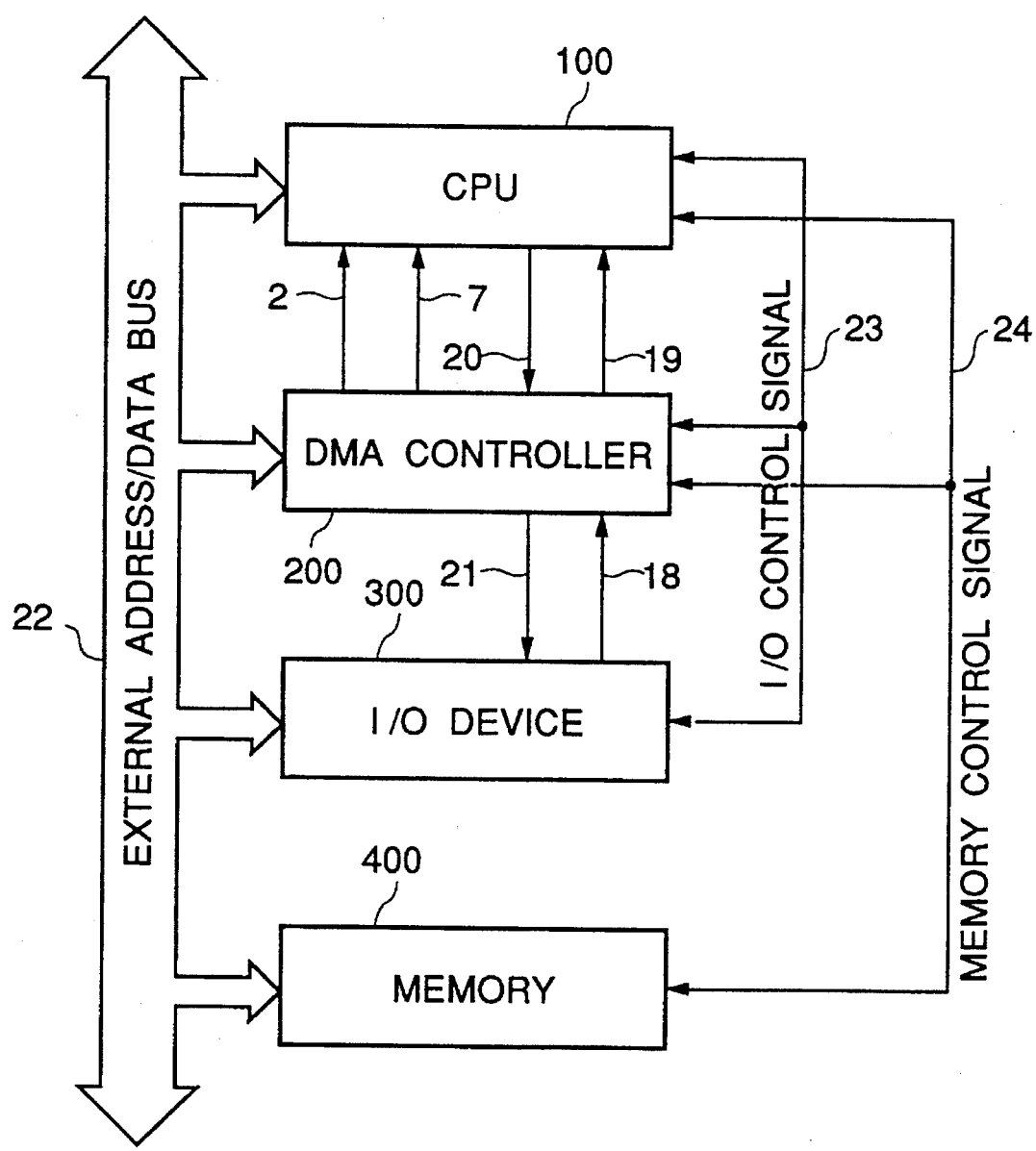
FIG. 1 is a block diagram of a system including an embodiment of the DMA controller in accordance with the present invention.

Referring to FIG. 1, there is shown a block diagram of a system including an embodiment of the DMA controller in accordance with the present invention.

The shown system includes a CPU (central processing unit) 100, a DMA controller 200, an I/O (input/output) device 300 and a memory 400, which are coupled to one another through an external address/data bus 22. In addition, an I/O control signal is transferred between the CPU 100, the DMA controller 200 and the I/O device 300 through a control signal line 23, and a memory control signal is transferred between the CPU 100, the DMA controller 200 and the memory 400 through another control signal line 24.

The I/O device 300 generates a DMA transfer request signal 18 to the DMA controller 200, and in response to the DMA transfer request signal 18, the DMA controller 200 generates a bus open request signal 19 to the CPU 100. On the other hand, the CPU 100 generates a bus open acknowledge signal 20 to the DMA controller 200, and the DMA controller 200 generates a DMA transfer request acknowledge signal 21 to the I/O device 300. Furthermore, the DMA controller 200 supplies a transfer completion status signal 2 and a halt status signal 7 to the CPU 100. In the shown system, as well known to persons skilled in the art, other various signals are generated and transferred between different units, however, these signals are omitted in the drawings for simplification, since these signals do not directly relate to the present invention.

Figure 2:
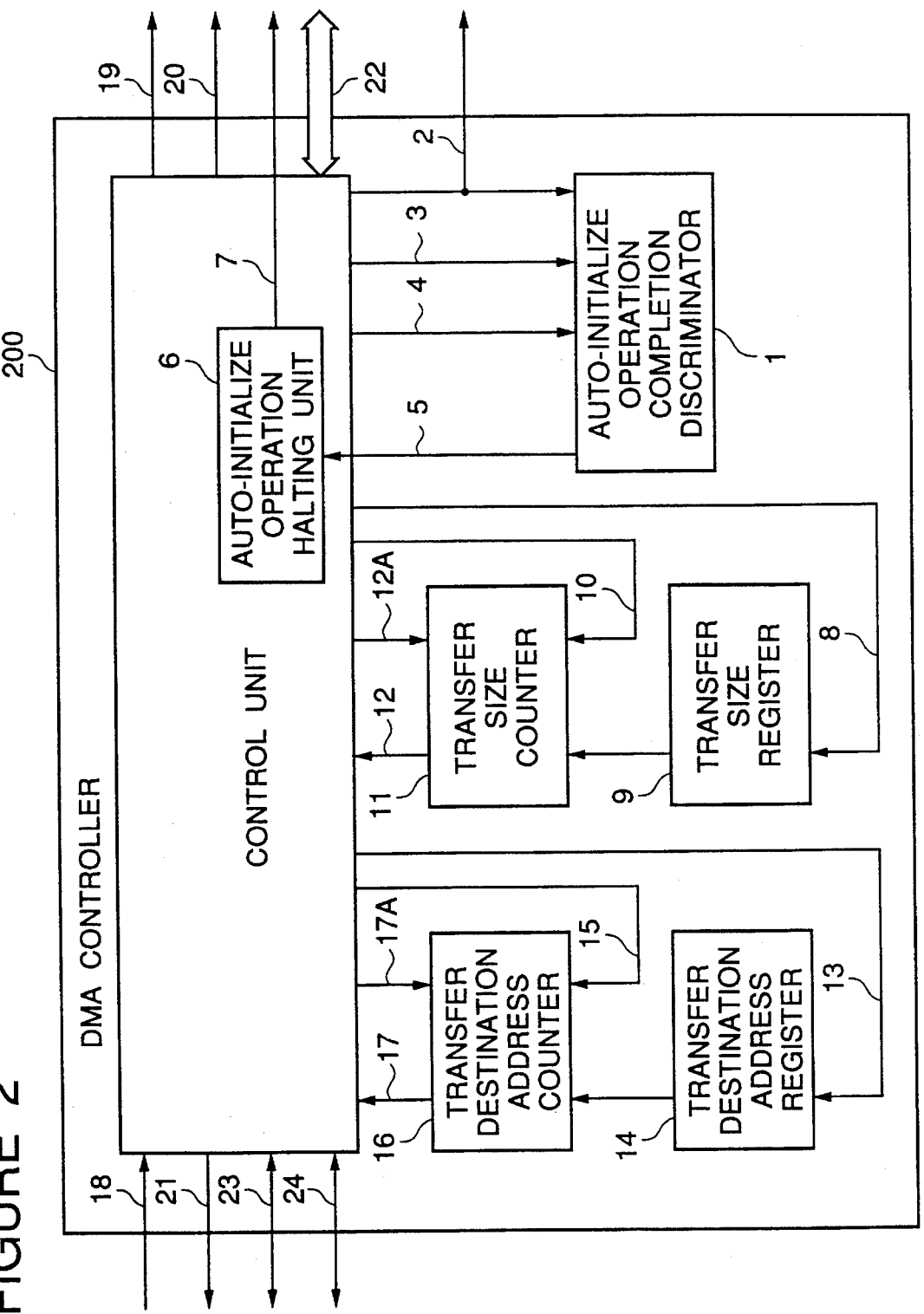
FIG. 2 is a block diagram of the DMA controller shown in FIG. 1.

Referring to FIG. 2, the DMA controller 200 includes an auto-initialize operation completion discriminator 1, a transfer size register 9, a transfer size counter 11, a transfer destination address register 14, a transfer destination address counter 16, and a control unit 25 containing therein an auto-initialize operation halting unit 6, which are coupled as shown.

The control unit 25 generates the above mentioned transfer completion status signal 2 indicating that one DMA transfer (namely, one series of DMA transfer operations) is completed, an auto-initialize halt operation setting signal 3 indicating that an auto-initialize halting mode is set, and a register write confirmation status signal 4 indicating that a new value or values are written into either or both of the transfer size register 9 and the transfer destination address register 14. These signals are supplied to the auto-initialize operation completion discriminator 1. When all of the transfer completion status signal 2, the auto-initialize halt operation setting signal 3 and the register write confirmation status signal 4 are active, the auto-initialize operation completion discriminator 1 generates a halt request signal 5 to the auto-initialize operation halting unit 6. In response to the halt request signal 5, the auto-initialize operation halting unit 6 halts the auto-initialize operation, and generates a halt status signal 7 indicating that the auto-initialize operation has been halted.

More specifically, similarly to a conventional DMA controller having the auto-initialize operation, before one series of DMA transfer operations has been completed, a set value indicative of the number of DMA transfer operations to be performed in another series of DMA transfer operations to be executed next to the first mentioned series of DMA transfer operations, is written to the transfer size register 9 through a line 8 by the control unit 25. In addition, before the first mentioned series of DMA transfer operations has been completed, a set value indicative of a transfer destination head address for the second mentioned series of DMA transfer operations is written to the transfer destination address register 14 through a line 13 by the control unit 25.

The control unit 25 is configured to restart the DMA transfer operation (namely, to start another series of DMA transfer operations) by using the set values of the transfer size register 9 and the transfer destination address register 14, when the DMA transfer operations of the number indicated by the value loaded in the transfer size counter 11 are completed. When the DMA transfer operation is restarted, a transfer size counter load signal 10 is outputted from the control unit 25 to the transfer size counter 11, so that the set value of the transfer size register 9 is loaded to the transfer size counter 11. At the same time, a transfer destination address load signal 15 is outputted from the control unit 25 to the transfer destination address counter 16, so that the set value of the transfer destination address register 14 is loaded to the transfer destination address counter 17.

A content of the transfer size counter 11 supplied through a line 12 to the control unit 25, and is decremented by a decrement signal 12A generated at each time one DMA transfer operation is completed in the course of execution of the series of DMA transfer operations. When the content of the transfer size counter 11 becomes zero, the control unit 25 can know that the series of DMA transfer operations have been completed. In addition, a content of the transfer destination address counter 16 is supplied through a line 17 to the control unit 25 as a transfer destination address, and is incremented by an increment signal 17A generated at each time one DMA transfer operation is completed in the course of execution of the series of DMA transfer operations.

Now, operation of the system shown in FIGS. 1 and 2 will be described with reference to FIG. 3.

If the DMA transfer request signal 18 ("A" in FIG. 3) is rendered active, the control unit 25 of DMA controller 200 activates the bus open request signal 19 so as to request the CPU 100 to open the external address/data bus 22. In response to the bus open request signal 19, the CPU 100 activates the bus open acknowledge signal 20 and opens the external address/data bus 22 so that the external address/data bus 22 becomes available to the DMA controller 200. In response to the active bus open acknowledge signal 20, the control unit 25 of the DMA controller 200 activates the DMA transfer request acknowledge signal 21 ("B" in FIG. 3) for the purpose of notifying to a device (represented by the I/O device 300 in FIG. 1) which generated the DMA transfer request signal 18, that the DMA transfer is going to start.

Figure 3:
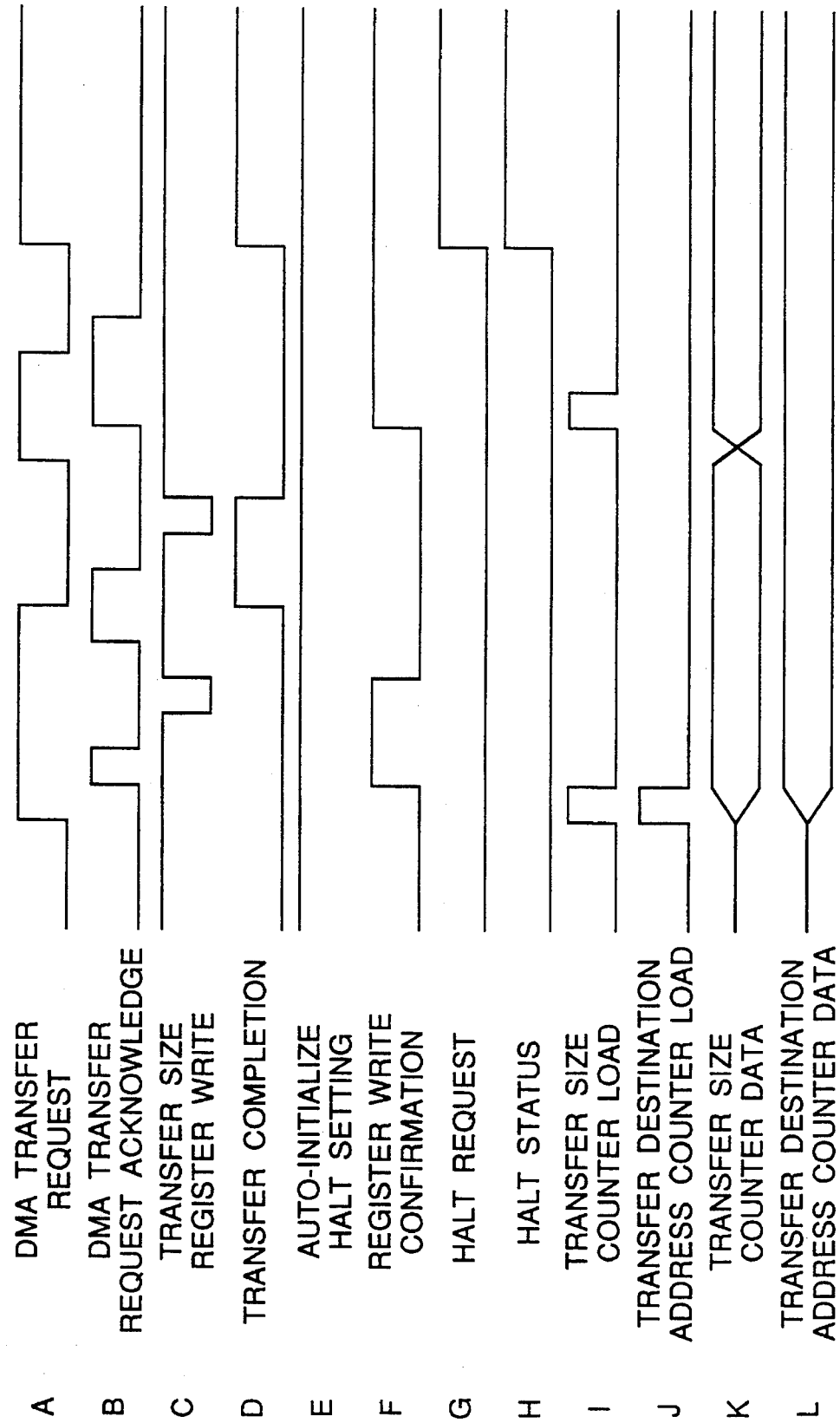
FIG. 3 is a timing chart illustrating an operation of the system shown in FIG. 1.

At this time, the control unit 25 activates the transfer size counter load signal 10 and the transfer destination address counter load signal 15 ("I" and "J" in FIG. 3), so that the content of the transfer size register 9 is loaded to the transfer size counter 11 ("K" in FIG. 3) and the content of the transfer destination address register 14 is loaded to the transfer destination address counter 16 ("L" in FIG. 3). In addition, the control unit 25 activates the register write confirmation status signal 4 ("F" in FIG. 3).

Thus, the control unit 25 of the DMA controller 200 executes the DMA transfer on the basis of the transfer size counter 11 and the transfer destination address counter 16. At each time one DMA transfer operation is completed, the transfer size counter 11 is decremented in response to the decrement signal 12A, and the transfer destination address counter 16 is incremented in response to the increment signal 17A. When the content of the transfer size counter 11 becomes zero, it means that the data transfer of the amount set in the transfer size register 9 has been completed, and the control unit 25 activates the transfer completion status signal 2 ("D" in FIG. 3), so as to notify the completion of the data transfer to the auto-initialize operation completion discriminator 1.

In the course of the execution of the DMA transfer, if a new value is written to the transfer size register 9 in response to the transfer size register write signal 8 ("C" in FIG. 3: active low), the control unit 25 inactivates the register write confirmation status signal 4 ("F" in FIG. 3) when the control unit 25 detects the writing of the transfer size register 9.

When the transfer completion status signal 2 become active, if both of the auto-initialize halt operation setting signal 3 and the register write confirmation status signal 4 are active, the auto-initialize operation completion discriminator 1 activates the halt request signal 5 so as to request the auto-initialize operation halting unit 6 to halt a continuous DMA transfer operation based on the auto-initialize mode. However, if only the register write confirmation status signal 4 is inactive but the auto-initialize halt operation setting signal 3 is active ("E" and "F" in FIG. 3), when a next DMA transfer is executed, the control unit 25 activates the transfer size counter load signal 10 so that the contents of the transfer size register 9 is loaded to the transfer size counter 11, and on the other hand, the value of the transfer destination address counter 16 when the preceding data transfer was completed is continuously used as it is. Thus, a second DMA transfer is executed.

When the halt request signal 5 is rendered active ("G" in FIG. 3), the auto-initialize operation halting unit 6 activates the halt status signal 7 ("H" in FIG. 3) so as to notify to the CPU 100 that the auto-initialize operation has been halted. Therefore, even if a new DMA transfer request is generated, the DMA transfer request acknowledge signal 21 is in no way activated ("A" and "B" in FIG. 3), and therefore, the DMA transfer operation is not started.

If the auto-initialize halt operation setting signal 3 is inactive, the DMA transfer operation based on the auto-initialize mode is executed similarly to the conventional DMA controller, regardless of the register write confirmation status signal 4.

The above operation is in the case that the auto-initialize operation is set for only the transfer size. However, in the case that the auto-initialize operation is set for only the transfer head address or for both of the transfer size and the transfer head address, the above mentioned DMA controller operates similarly to the above mentioned case, excluding the updating of the transfer size register 9, the transfer size counter 11, the transfer destination address register 14 and the transfer destination address counter 16. However, the updating of these registers and counters would be understood from the above mentioned explanation. Therefore, operation of these two cases will be omitted.

As seen from the above description of the embodiment with reference to the drawings, if during the execution of the auto-initialize DMA transfer, the set values of either or both of the transfer size and the transfer destination head address for a next DMA transfer were not written by the CPU, the DMA transfer operation based on the auto-initialize mode is automatically halted. Therefore, when the transfer size and/or the transfer destination head address is not written during the execution of the auto-initialize DMA transfer, it is possible to maintain the system in a stable condition. In addition, since the limitation of the time for writing the transfer size register and the transfer destination address register becomes nothing, the CPU can execute processings other than the DMA controller, with a sufficient time. Therefore, a programming for the CPU including the control of the DMA controller becomes easy.

The invention has thus been shown and described with reference to the specific embodiments. However, it should be noted that the present invention is in no way limited to the details of the illustrated structures but changes and modifications may be made within the scope of the appended claims.

I claim:

1. A Direct Memory Access (DMA) controller comprising:

a transfer size register written, before a first series of DMA transfer operations being executed are completed, with the number of DMA transfer operations to be performed in a second series of DMA transfer operations to be executed after said first series of DMA transfer operations are executed;

a transfer destination address register written, before said first series of DMA transfer operations being executed are completed, with a transfer destination head address for said second series of DMA transfer operations to be executed after said first series of DMA transfer operations are executed;

a control unit configured to start a DMA transfer for said second series of DMA transfer operations by using values of the number of DMA transfer operations and the transfer destination head address respectively written in said transfer size register and said transfer destination address register and to generate a transfer completion status signal, when the DMA transfer for said first series of DMA transfer operations has been completed, said control unit being also configured to generate an auto-initialize halt operation setting signal indicating that an auto-initialize operation halting mode is set, and a register write confirmation status signal indicating that a new set value is written into either or both of said transfer size register and said transfer destination address register during execution of the DMA transfer for said first series of DMA transfer operations;

an auto-initialize operation completion discriminator, receiving said transfer completion status signal, said auto-initialize halt operation setting signal and said register write confirmation status signal, for generating a halt request signal when all of said transfer completion status signal, said auto-initialize halt operation setting signal and said register write confirmation status signal are active; and an auto-initialize operation halting unit responding to said halt request signal so as to halt an auto-initialize operation and to generate a signal indicating that the auto-initialize operation has been halted.

2. A DMA controller claimed in claim 1 further including:

a transfer size counter loaded with a content of said transfer size register when said control unit starts one of the DMA transfer for said first series of DMA transfer operations and the DMA transfer for said second series of DMA transfer operations, said transfer size counter being updated at each time one DMA transfer operation is performed during execution of a series of DMA transfer operations; and a transfer destination address counter loaded with a content of said transfer destination address register when said control unit starts one of the DMA transfer for said first series of DMA transfer operations and the DMA transfer for said second series of DMA transfer operations, said transfer destination address counter being updated at each time one DMA transfer operation is performed during execution of the series of DMA transfer operations.

3. A DMA controller claimed in claim 1 further including:

a transfer size counter loaded with a content of said transfer size register when said control unit starts one of the DMA transfer for said first series of DMA transfer operations and the DMA transfer for said second series of DMA transfer operations, said transfer size counter being updated at each time one DMA transfer operation is performed during execution of a series of DMA transfer operations.

4. A DMA controller claimed in claim 1 further including:
a transfer destination address counter loaded with a content of said transfer destination address register when said control unit starts one of the DMA transfer for said first series of DMA transfer operations and the DMA transfer for said second series of DMA transfer operations, said transfer destination address counter being updated at each time one DMA transfer operation is performed during execution of a series of DMA transfer operations.

* * * * *